(12) United States Patent
Wang et al.

(10) Patent No.: US 12,167,374 B2
(45) Date of Patent: Dec. 10, 2024

(54) DATA TRANSMISSION CONTROL

(71) Applicant: Nokia Solutions and Networks Oy, Espoo (FI)

(72) Inventors: Yonggang Wang, Shanghai (CN); Hua Chao, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 545 days.

(21) Appl. No.: 17/293,885

(22) PCT Filed: Nov. 16, 2018

(86) PCT No.: PCT/CN2018/115850
§ 371 (c)(1),
(2) Date: May 13, 2021

(87) PCT Pub. No.: WO2020/097905
PCT Pub. Date: May 22, 2020

(65) Prior Publication Data
US 2022/0015079 A1 Jan. 13, 2022

(51) Int. Cl.
*H04W 72/12* (2023.01)
*H04W 72/044* (2023.01)
*H04W 72/541* (2023.01)

(52) U.S. Cl.
CPC ....... *H04W 72/044* (2013.01); *H04W 72/541* (2023.01)

(58) Field of Classification Search
CPC .. H04J 11/0036; H04L 1/0001; H04L 1/0015; H04L 1/0025; H04L 1/08;
(Continued)

(56) References Cited

U.S. PATENT DOCUMENTS 8,625,442 B2 1/2014 Ratasuk et al.
8,767,596 B2 7/2014 Ratasuk et al.
(Continued)

FOREIGN PATENT DOCUMENTS

CN 106507497 A 3/2017
CN 107889231 A 4/2018
(Continued)

OTHER PUBLICATIONS

Extended European Search Report received for corresponding European Patent Application No. 18940082.3, dated May 31, 2022, 9 pages.
(Continued)

*Primary Examiner* — Phuc H Tran
(74) *Attorney, Agent, or Firm* — HARNESS, DICKEY & PIERCE, P.L.C.

(57) ABSTRACT

An apparatus comprising: at least one processor; and at least one memory including computer program code; the at least one memory and the computer program code configured to, with the at least one processor, cause the apparatus at least to perform: receiving at least one signal comprising control information; determining data to transmit using grant-free data transmission; determining whether grant-free data transmission using time-frequency repetition is permitted for the grant-free data transmission in dependence on the received control information; if it is determined that use of time-frequency repetition for the grant-free data transmission is permitted, causing transmission of grant-free data transmission using time-frequency repetition; and if it is determined that use of time-frequency repetition for the grant-free data transmission is not permitted, causing transmission of grant-free data transmission without using time-frequency repetition.

8 Claims, 5 Drawing Sheets

(58) Field of Classification Search
CPC ........... H04W 72/044; H04W 72/1268; H04W 72/23; H04W 72/541
See application file for complete search history.

(56) References Cited

U.S. PATENT DOCUMENTS

| | | | |
|---|---|---|---|
| 9,743,423 | B2 | 8/2017 | Liu et al. |
| 2018/0035458 | A1 | 2/2018 | Islam et al. |
| 2018/0115988 | A1 | 4/2018 | Lee et al. |
| 2018/0145790 | A1* | 5/2018 | Xu .................. H04W 72/04 |
| 2018/0176945 | A1* | 6/2018 | Cao .................. H04L 5/0044 |
| 2018/0199359 | A1* | 7/2018 | Cao .................. H04L 1/1896 |
| 2020/0145978 | A1* | 5/2020 | Gulati ............... H04W 72/044 |

FOREIGN PATENT DOCUMENTS

| | | |
|---|---|---|
| CN | 108616922 | 10/2018 |
| WO | WO-2017000233 | 1/2017 |
| WO | WO-2017167198 | 10/2017 |
| WO | WO-2018028320 | 2/2018 |
| WO | 2018/063845 A1 | 4/2018 |
| WO | WO-2018064582 | 4/2018 |
| WO | 2018/175597 A1 | 9/2018 |
| WO | WO-2018182264 A1 | 10/2018 |

OTHER PUBLICATIONS

"Enhancement for UL grant-free transmissions", 3GPP TSG RAN WG1 Meeting #95, R1-1813884, Agenda : 7.2.6.3, ZTE, Nov. 12-16, 2018, pp. 1-9.

Singh et al., "Grant-free Transmissions for Ultra-reliable and Low Latency Uplink Communications", Conference: European Conference on Networks and Communications (EuCNC), Jun. 2018, 2 pages.

International Search Report and Written Opinion received for corresponding Patent Cooperation Treaty Application No. PCT/CN2018/115850, dated Jun. 28, 2019, 10 pages.

"Discussion on PUSCH Repetition for Grant-free Transmission", 3GPP TSG RAN WG1 Meeting #92bis , R1-1804103, Agenda : 7.1.3.3.4, CMCC, Apr. 16-20, 2018, 3 pages.

3GPP TSG-RAN WG1#88bis, "UL grant-free transmission for URLLC," Spokane, WA, Apr. 3-7, 2017.

3GPP TSG-RAN WG1#88, "UL grant-free transmission for URLLC," Athena, Greece, Feb. 13-17, 2017.

3GPP TSG-RAN WG1#87, "Grant-free HARQ for URLLC," Reno, NV, Nov. 14-18, 2016.

3GPP TSG RAN WG1#81, "Multi-carrier LBT operation for LAA," Fukuoka, Japan, May 25-29. 2015.

Chinese Office Action mailed Sep. 28, 2023.

European Office Action dated Sep. 13, 2024 for corresponding European Patent Application No. 18940082.3.

* cited by examiner

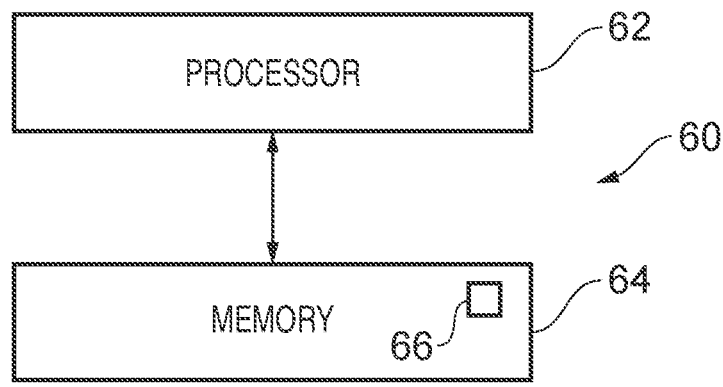
FIG. 6A
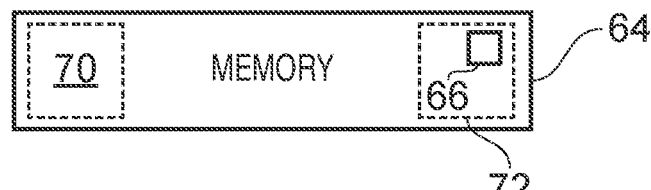
FIG. 6B
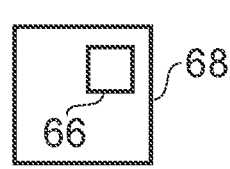    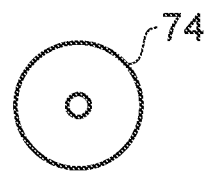    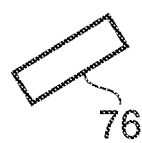
FIG. 7A          FIG. 7B       FIG. 7C

DATA TRANSMISSION CONTROL

RELATED APPLICATION

This application was originally filed as PCT Application No. PCT/CN2018/115850, filed on Nov. 16, 2018, each of which is incorporated herein by reference in its entirety.

TECHNOLOGICAL FIELD

Embodiments of the present disclosure relate to data transmission control. Some embodiments relate to control of time-frequency repetition in grant-free data transmissions.

BACKGROUND

It would desirable to improve control of data transmission. For example, it would be desirable to improve control of time-frequency repetition in grant-free data transmissions. Time-frequency repetition allows a transmitting apparatus to send more than one copy of the same data.

The inventors have realized that it is desirable to improve control of time-frequency repetition in grant-free data transmissions.

Control of time-frequency repetition in grant-free data transmissions provides for improved transmission efficiency.

BRIEF SUMMARY

According to various, but not necessarily all, embodiments there is provided an apparatus comprising:
at least one processor; and
at least one memory including computer program code;
the at least one memory and the computer program code configured to, with the at least one processor, cause the apparatus at least to perform:
receiving at least one signal comprising control information;
determining data to transmit using grant-free data transmission;
determining whether grant-free data transmission using time-frequency repetition is permitted for the grant-free data transmission in dependence on the received control information;
if it is determined that use of time-frequency repetition for the grant-free data transmission is permitted, causing transmission of grant-free data transmission using time-frequency repetition; and
if it is determined that use of time-frequency repetition for the grant-free data transmission is not permitted, causing transmission of grant-free data transmission without using time-frequency repetition.

In some but not necessarily all examples the at least one memory and the computer program configured to, with the at least one processor, cause the apparatus at least to perform:
including a first signature with grant-free data transmissions using time-frequency repetition and including a second, different signature with grant-free data transmissions not using time-frequency repetition.

In some but not necessarily all examples the control information is configured to control whether time-frequency repetition is permitted for a grant-free data transmission in terms of a probability.

In some but not necessarily all examples the control information comprises at least one control parameter.

In some but not necessarily all examples the at least one memory and the computer program code configured to, with the at least one processor, cause the apparatus at least to perform:
generating at least one random number;
comparing the at least one random number with the at least one control parameter; and;
determining whether grant-free data transmission using time-frequency repetition is permitted for a grant-free data transmission in dependence on the comparison.

In some but not necessarily all examples the at least one memory and the computer program code configured to, with the at least one processor, cause the apparatus at least to perform:
determining a time period for which the control information is valid.

In some but not necessarily all examples the at least one memory and the computer program code configured to, with the at least one processor, cause the apparatus at least to perform:
receiving at least one signal comprising configuration information of a time-frequency resource pool comprising a plurality of time-frequency blocks in which grant-free data transmissions can be transmitted.

In some but not necessarily all examples the at least one memory and the computer program code configured to, with the at least one processor, cause the apparatus at least to perform:
receiving updated configuration information of an updated time-frequency resource pool comprising a plurality of time-frequency blocks in which grant-free data transmissions can be transmitted.

According to various, but not necessarily all, embodiments there is provided a method comprising:
receiving at least one signal comprising control information;
determining data to transmit using grant-free data transmission;
determining whether grant-free data transmission using time-frequency repetition is permitted for the grant-free data transmission in dependence on the received control information;
if it is determined that use of time-frequency repetition for the grant-free data transmission is permitted, causing transmission of grant-free data transmission using time-frequency repetition; and
if it is determined that use of time-frequency repetition for the grant-free data transmission is not permitted, causing transmission of grant-free data transmission without using time-frequency repetition.

In some but not necessarily all examples the method comprising:
including a first signature with grant-free data transmissions using time-frequency repetition and including a second, different signature with grant-free data transmissions not using time-frequency repetition.

In some but not necessarily all examples the control information is configured to control whether time-frequency repetition is permitted for a grant-free data transmission in terms of a probability.

In some but not necessarily all examples the control information comprises at least one control parameter.

In some but not necessarily all examples the method comprising:
generating at least one random number;
comparing the at least one random number with the at least one control parameter; and;

determining whether grant-free data transmission using time-frequency repetition is permitted for a grant-free data transmission in dependence on the comparison.

In some but not necessarily all examples the method comprising:
determining a time period for which the control information is valid.

In some but not necessarily all examples the method comprising:
receiving at least one signal comprising configuration information of a time-frequency resource pool comprising a plurality of time-frequency blocks in which grant-free data transmissions can be transmitted.

In some but not necessarily all examples the method comprising:
receiving updated configuration information of an updated time-frequency resource pool comprising a plurality of time-frequency blocks in which grant-free data transmissions can be transmitted.

According to various, but not necessarily all, embodiments there is provided an apparatus comprising:
means for receiving at least one signal comprising control information;
means for determining data to transmit using grant-free data transmission;
means for determining whether grant-free data transmission using time-frequency repetition is permitted for the grant-free data transmission in dependence on the received control information;
means for, if it is determined that use of time-frequency repetition for the grant-free data transmission is permitted, causing transmission of grant-free data transmission using time-frequency repetition; and
means for, if it is determined that use of time-frequency repetition for the grant-free data transmission is not permitted, causing transmission of grant-free data transmission without using time-frequency repetition.

According to various, but not necessarily all, embodiments there is provided an apparatus comprising means for performing or means for causing performance of the method.

According to various, but not necessarily all, embodiments there is provided an apparatus configured as mobile equipment and/or configured as user equipment.

According to various, but not necessarily all, embodiments there is provided a computer program comprising instructions for causing an apparatus to perform at least the following:
receiving at least one signal comprising control information;
determining data to transmit using grant-free data transmission;
determining whether grant-free data transmission using time-frequency repetition is permitted for the grant-free data transmission in dependence on the received control information;
if it is determined that use of time-frequency repetition for the grant-free data transmission is permitted, causing transmission of grant-free data transmission using time-frequency repetition; and
if it is determined that use of time-frequency repetition for the grant-free data transmission is not permitted, causing transmission of grant-free data transmission without using time-frequency repetition.

According to various, but not necessarily all, embodiments there is provided a computer program comprising instructions for causing an apparatus to perform at least a method as described.

According to various, but not necessarily all, embodiments there is provided a non-transitory computer readable medium comprising a computer program as described.

According to various, but not necessarily all, embodiments there is provided an apparatus comprising:
at least one processor; and
at least one memory including computer program code;
the at least one memory and the computer program code configured to, with the at least one processor, cause the apparatus at least to perform:
receiving a plurality of grant-tree data transmissions in at least one time-frequency block of a time-frequency resource pool comprising a plurality of time-frequency blocks, the plurality of grant-free data transmissions from a plurality of apparatuses;
determining an interference level of the plurality of grant-free data transmissions in relation to the time-frequency blocks of the resource pool;
determining control information in dependence on the determined interference level;
causing transmission of the control information to at least one of the plurality of apparatuses to control usage of time-frequency repetition in grant-free data transmissions from the apparatuses.

In some but not necessarily all examples determining an interference level comprises determining a number of time-frequency blocks in which grant-free data transmissions from a plurality of different apparatuses are received.

In some but not necessarily all examples determining an interference level comprises dividing the determined number of time-frequency blocks by the total number of time-frequency blocks in the time-frequency resource pool.

In some but not necessarily all examples determining an interference level comprises determining a number of decoding fails for the plurality of received grant-free data transmissions.

In some but not necessarily all examples the at least one memory and the computer program code configured to, with the at least one processor, cause the apparatus at least to perform:
determining the number of different apparatuses from which at least one grant-free data transmission is received for the time-frequency resource pool, wherein determining an interference level comprises dividing the determined number of decoding fails by the determined number of different apparatuses.

In some but not necessarily all examples determining control information comprises determining at least one control parameter.

In some but not necessarily all examples the control information is configured to control whether or not an apparatus can use time-frequency repetition for a grant-free data transmission.

In some but not necessarily all examples the at least one memory and the computer program code configured to, with the at least one processor, cause the apparatus at least to perform:
causing transmission of configuration information of the time-frequency resource pool comprising a plurality of time-frequency blocks.

In some but not necessarily all examples the at least one memory and the computer program code configured to, with the at least one processor, cause the apparatus at least to perform:

causing transmission of updated configuration information of an updated time-frequency resource pool comprising a plurality of time-frequency blocks in which grant-free data transmissions can be transmitted.

According to various, but not necessarily all, embodiments there is provided a method comprising:

receiving a plurality of grant-free data transmissions in at least one time-frequency block of a time-frequency resource pool comprising a plurality of time-frequency blocks, the plurality of grant-free data transmissions from a plurality of apparatuses;

determining an interference level of the plurality of grant-free data transmissions in relation to the time-frequency blocks of the resource pool;

determining control information in dependence on the determined interference level;

causing transmission of the control information to at least one of the plurality of apparatuses to control usage of time-frequency repetition in grant-free data transmissions from the apparatuses.

In some but not necessarily all examples determining an interference level comprises determining a number of time-frequency blocks in which grant-free data transmissions from a plurality of different apparatuses are received.

In some but not necessarily all examples determining an interference level comprises dividing the determined number of time-frequency blocks by the total number of time frequency blocks in the time-frequency resource pool.

In some but not necessarily all examples determining an interference level comprises determining a number of decoding fails for the plurality of received grant-free data transmissions.

In some but not necessarily all examples the method comprising:

determining the number of different apparatuses from which at least one grant-free data transmission is received for the time-frequency resource pool, wherein determining an interference level comprises dividing the determined number of decoding fails by the determined number of different apparatuses.

In some but not necessarily all examples determining control information comprises determining at least one control parameter.

In some but not necessarily all examples the control information is configured to control whether or not an apparatus can use time-frequency repetition for a grant-free data transmission.

In some but not necessarily all examples the method comprising:

causing transmission of configuration information of a time-frequency resource pool comprising a plurality of time-frequency blocks.

In some but not necessarily all examples the method comprising:

causing transmission of updated configuration information of an updated time-frequency resource pool comprising a plurality of time-frequency blocks in which grant-free data transmissions can be transmitted.

According to various, but not necessarily all, examples there is provided an apparatus comprising:

means for receiving a plurality of grant-free data transmissions in at least one time-frequency block of a time-frequency resource pool comprising a plurality of time-frequency blocks, the plurality of grant-free data transmissions from a plurality of apparatuses;

means for determining an interference level of the plurality of grant-free data transmissions in relation to the time-frequency blocks of the resource pool;

means for determining control information in dependence on the determined interference level;

means for causing transmission of the control information to at least one of the plurality of apparatuses to control usage of time-frequency repetition in grant-free data transmissions from the apparatuses.

According to various, but not necessarily all, embodiments there is provided an apparatus comprising means for performing or means for causing performance of the method.

According to various, but not necessarily all, embodiments, there is provided an apparatus configured as a server network element.

According to various, but not necessarily all, embodiments there is provided a computer program comprising instructions for causing an apparatus to perform at least the following:

receiving a plurality of grant-free data transmissions in at least one time-frequency block of a time-frequency resource pool comprising a plurality of time-frequency blocks, the plurality of grant-free data transmissions from a plurality of apparatuses;

determining an interference level of the plurality of grant-free data transmissions in relation to the time-frequency blocks of the resource pool;

determining control information in dependence on the determined interference level;

causing transmission of the control information to at least one of the plurality of apparatuses to control usage of time-frequency repetition in grant-free data transmissions from the apparatuses.

According to various, but not necessarily all, embodiments there is provided a computer program comprising instructions for causing an apparatus to perform at least a method as described.

According to various, but not necessarily all, embodiments there is provided a non-transitory computer readable medium comprising a computer program as described.

According to various, but not necessarily all, embodiments there is provided an apparatus comprising:

at least one processor; and at least one memory including computer program code;

the at least one memory and the computer program code configured to, with the at least one processor, cause the apparatus at least to perform:

receiving at least one signal comprising control information;

determining data to transmit using grant-free data transmission using time-frequency repetition;

determining a number of time-frequency repetitions to use in the grant-free data transmission in dependence on the control information;

causing transmission of grant-free data transmission using the determined number of time-frequency repetitions.

According to various, but not necessarily all, embodiments there is provided an apparatus comprising:

at least one processor; and at least one memory including computer program code;

the at least one memory and the computer program code configured to, with the at least one processor, cause the apparatus at least to perform:

receiving a plurality of grant-free data transmissions in at least one time-frequency block of a time-frequency resource pool comprising a plurality of time-frequency blocks, the plurality of grant-free data transmissions from a plurality of apparatuses;

determining an interference level of the plurality of grant-free data transmissions in relation to the time-frequency blocks of the resource pool;

determining control information in dependence on the determined interference level;

causing transmission of the control information to at least one of the plurality of apparatuses to control the number of repetitions used in time-frequency repetition in grant-free data transmissions from the apparatuses.

The description of a function should additionally be considered to also disclose any means suitable for performing that function.

BRIEF DESCRIPTION

Some example embodiments will now be described with reference to the accompanying drawings in which:

FIG. 6A shows an example embodiment of the subject matter described herein;

FIG. 6B shows an example embodiment of the subject matter described herein;

FIG. 7 shows an example embodiment of the subject matter described herein;

FIG. 7A shows an example embodiment of the subject matter described herein;

FIG. 7B shows an example embodiment of the subject matter described herein;

FIG. 7C shows an example embodiment of the subject matter described herein.

DETAILED DESCRIPTION

Figure 1:
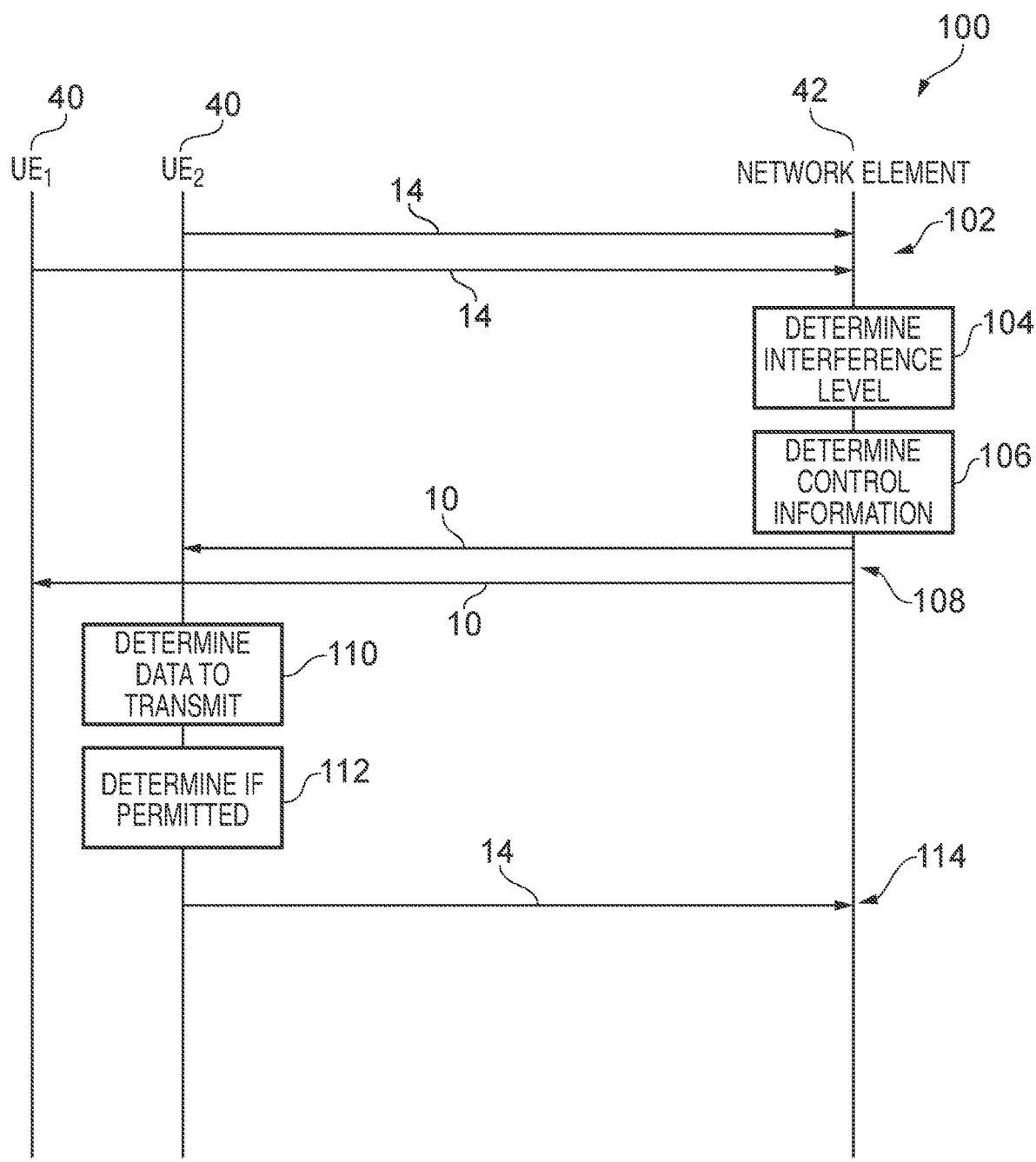
FIG. 1 shows an example embodiment of the subject matter described herein.

FIG. 1 illustrates an example of a method 100.

In the example of FIG. 1, a plurality of apparatuses communicate across a network. In examples, any suitable form of communication in any suitable network setup may be used.

In examples the network is a cellular network comprising a plurality of cells, a plurality of access nodes and a plurality of terminal nodes.

In some, but not necessarily all, examples the network is a third generation Partnership Project (3GPP) network in which the terminal nodes are user equipment (UE) 40 and the access nodes are base stations.

In the illustrated example, a plurality of client apparatuses or terminal nodes are communicating with a server network element 42 or base stations. In particular, a plurality of user equipment ($UE_1$, $UE_2$) 40 are communicating with a server network element across a network.

In examples, the communications between the elements illustrated in FIG. 1 can proceed via any number of intervening elements, including no intervening elements.

Although two UEs 40 are illustrated in the example of FIG. 1, in examples any suitable number of UEs 40 may be included. Similarly, in examples any suitable number of network elements 42 may be included.

The method 100, at block 102, comprises receiving a plurality of grant-free data transmissions 14 in at least one time-frequency block 24 of a time-frequency resource pool 22 comprising a plurality of time-frequency blocks 24, the plurality of grant-free data transmissions 14 from a plurality of apparatuses $UE_1$, $UE_2$ 40.

In examples, a grant-free data transmission 14 comprises one or more signals. Consequently receiving/transmitting a grant-free data transmission 14 comprises receiving/transmitting one or more signals.

A grant-free data transmission 14 is a transmission that the client device, such as $UE_1$, $UE_2$, does not need the dynamic and explicit scheduling grant from the network element, such as a next generation Node B (gNB) before initiating the data transmission. Furthermore, in grant-free data transmissions 14 multiple UEs are allowed to share the same resource, such as a time-frequency resource pool 22 comprising a plurality of time-frequency blocks 24.

Figure 3:
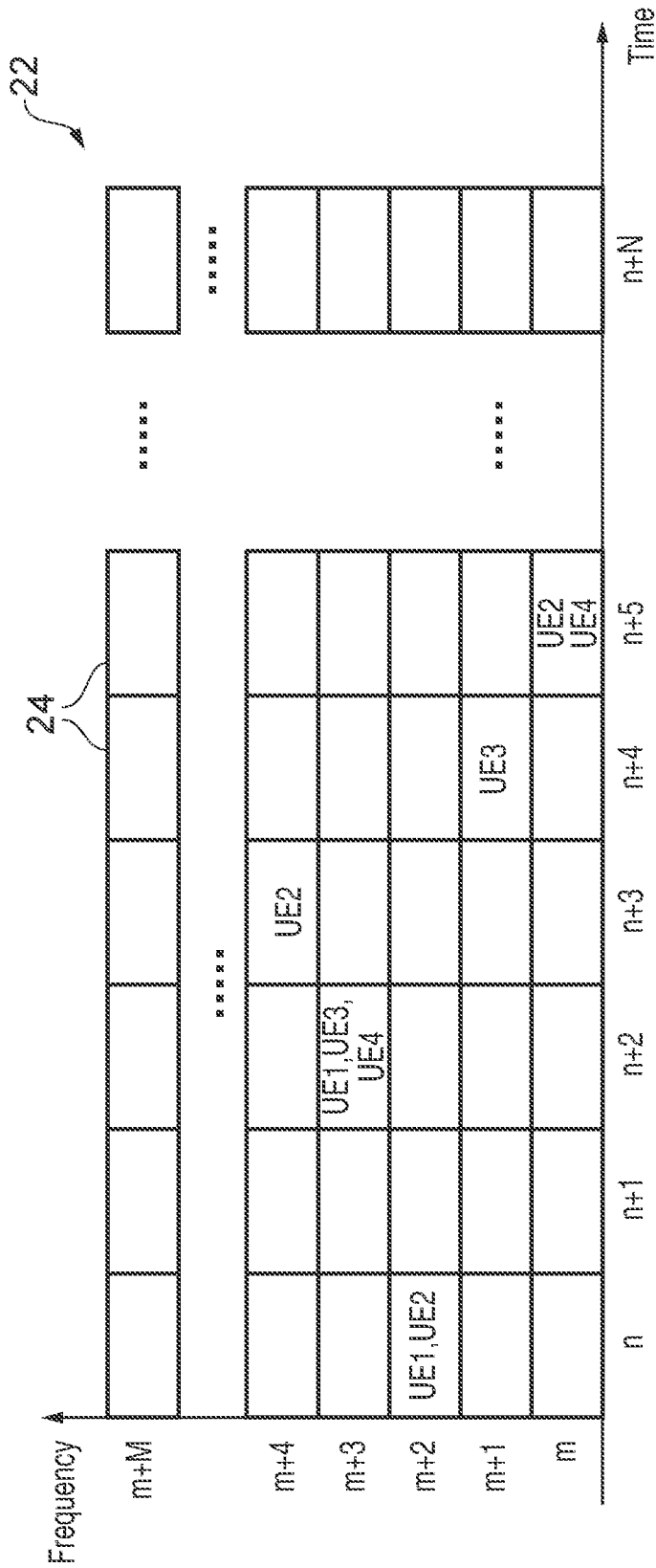
FIG. 3 shows an example embodiment of the subject matter described herein.

An example of a time-frequency resource pool 22 comprising a plurality of time-frequency blocks 24 is illustrated in the example of FIG. 3.

As FIG. 1 illustrates one or more actions of transmission of one or more signals between the UEs 40 and the network element 42 for any receiving action FIG. 1 also illustrates the corresponding transmitting/causing transmitting feature.

Similarly, for any transmitting/causing transmitting feature FIG. 1 also illustrates the corresponding receiving action.

For example, with regard to block 102 of FIG. 1, FIG. 1 also illustrates, with regard to $UE_1$, $UE_2$, causing transmission of a grant-free data transmission 14 in at least one time-frequency block 24 of a time-frequency resource pool 22 comprising a plurality of time-frequency blocks 24.

In examples, the use of time-frequency repetition by the apparatuses, such as the UEs, is initially unrestricted. For example, initial control information 10 may be used by the UEs, allowing unrestricted use of time-frequency repetition. Initial control information can comprise one or more control parameters 18.

In some examples initial control information 10 restricts usage of time-frequency repetition in some way, for example in terms of a probability.

In examples the initial control information 10 is predetermined in the UEs and can be updated by control information 10 received from the network element 42.

In some examples initial control information 10 is received from a network element 42 such as the network element 42 illustrated in the example of FIG. 1.

At block 104, method 100 comprises determining an interference level of the plurality of grant-free data transmissions 14 in relation to the time-frequency blocks 24 of the resource pool 22.

In examples determining an interference level comprises determining an interference level of the plurality of grant-free data transmissions 14 received in one or more time-frequency blocks 24 of the resource pool 22.

However, any suitable method for determining an interference level can be used.

In some examples determining an interference level comprises determining a level of interference between the grant-free data transmissions 14 in the resource pool 22.

In some, but not necessarily all, examples determining an interference level comprises determining a number of time-frequency blocks 24 in which grant-free data transmissions 14 from a plurality of apparatuses are received. See, for example, FIG. 3.

In examples, determining a number of different apparatuses from which grant-free data transmissions 14 are received comprises determining a number of different signatures included and/or associated with the grant-free data transmissions 14, the signatures identifying the transmitting apparatuses or UEs 40.

The signatures can be received from a network element 42, such as the network element 42 of FIG. 1.

In examples the signatures can be received by a network element 42, such as the network element 42 of FIG. 1.

In some examples, determining an interference level comprises dividing the determined number of time-frequency blocks 24 by the total number of time-frequency blocks 24 in the time-frequency resource pool 22.

In some, but not necessarily all, examples, determining an interference level comprises determining a number of decoding fails for the plurality of received grant-free data transmissions 14.

For example, in the example of FIG. 1 the network element attempts to successfully decode the data transmissions 14 from the UEs. However, the network element may be unsuccessful in doing so resulting in one or more decoding fails.

Any suitable form of decoding can be used. For example, any suitable form of multiple user detection technique, such as successive interference cancellation, can be used.

The number of decoding fails can be determined for a predetermined time period and/or for a resource pool 22.

For example, a decoding fail may arise due to multiple grant-free data transmissions 14 being received in a single time-frequency block 24 of the resource pool 22.

In some, but not necessarily all, examples the method 100 comprises determining the number of different apparatuses from which at least one grant-free data transmission 14 is received for the time-frequency resource pool 22, wherein determining an interference level comprises dividing the determined number of decoding fails by the determined number of different apparatuses.

In examples, determining the number of different apparatuses comprises determining the number of different signatures included/associated with the plurality of grant-free data transmissions 14 received at the network element 42.

At block 106 the method 100 comprises determining control information 10 in dependence on the determined interference level. In examples control information 10 can be considered control data 10.

In examples, any suitable method for determining control information 10 can be used.

For example, the network element 42 can use any suitable method to determine to control the usage of time-frequency repetition in dependence on the determined interference level.

Time-frequency repetition allows an apparatus, such as a UE 40, to send more than one copy of a grant-free data transmission 14 in a plurality of time-frequency blocks 24 of a time-frequency resource pool 22. This is to improve transmission efficiency in grant-free data transmissions 14 due to inevitable collisions of transmissions in a resource pool 22. See, for example, FIG. 3.

In examples time-frequency repetition can be referred to as diversity and therefore grant-free data transmissions 14 can be referred to as with or without diversity.

In some examples, determining control information 10 comprises determining that the determined interference level is too high. For example, determining control information 10 can comprise comparing the determined interference level against a pre-determined threshold.

In examples the network element 42 keeps a mapping table which maps interference levels to control information 10.

In some examples, the network element 42 determines that the interference level is acceptable and therefore no control information 10 is determined.

However, in the example of FIG. 1 at block 106 the network element determines that the determined interference level is too high and therefore determines control information 10.

In examples, determining control information 10 comprises determining at least one control parameter 18.

In examples, the control information 10 is configured to control whether or not an apparatus, such as a UE 40, can use time-frequency repetition for a grant-free data transmission 14.

For example, the control information 10 can be configured to control whether an apparatus, such as a UE 40, can use time-frequency repetition whenever the apparatus is to transmit grant-free data transmission 14.

At block 108 the method 100 comprises causing transmission of the control information 10 to at least one of the plurality of apparatuses to control usage of time-frequency repetition in grant-free data transmissions 14 from the apparatuses.

In the example of FIG. 1 the network element transmits one or more signals to $UE_1$ and $UE_2$ comprising the control information 10.

Consequently, at $UE_1$ and $UE_2$ the method 100 comprises receiving at least one signal comprising control information 10.

In some, but not necessarily all, examples the control information 10 is configured to control whether time-frequency repetition is permitted for a grant-free data transmission 14 in terms of a probability.

For example, the control information 10 can comprise at least one control parameter 18 to control the probability that an apparatus, such as $UE_1$ or $UE_2$, can use time-frequency repetition for a grant-free data transmission 14.

In examples, the method 100 comprises determining a time period for which control information 10 is valid.

In examples, the time period may be received from a network element and/or be predetermined.

At block 110 the method 100 comprises determining data to transmit using grant-free data transmission 14. In the illustrated example $UE_2$ determines that it has data to transmit however $UE_1$, in the illustrate example, does not.

At block 112, the method 100 comprises determining whether grant-free data transmission 14 using time-frequency repetition is permitted for the grant-free data transmission 14 in dependence on the received control information 10.

In examples, any suitable method for determining whether grant-free data transmission 14 using time-frequency repetition is permitted for the grant-free data transmission 14 in dependence on the received control information 10 can be used.

In examples, the method 100 comprises generating at least one random number and comparing the at least one random number with the control information 10.

Any suitable method for generating a random or pseudo-random number can be used.

In some examples, the method comprises generating at least one random number, comparing the at least one random number with at least one control parameter 18 of control information 10 and determining whether grant-free data transmission 14 using time-frequency repetition is permitted for a grant-free data transmission 14 in dependence on the comparison.

For example, if it is determined that the random number is lower than (in some examples including equal to) the control parameter 18 grant-free data transmission using time-frequency repetition is allowed and if the random number is higher than (in some examples including equal to) the control parameter 18 it is not.

In examples, the determination may comprise determining if the random number is higher than (in some examples including equal to) the control parameter 18 and if so determining that grant-free data transmission 14 using time-frequency repetition is permitted.

In FIG. 1, The method 100 comprises, if it is determined that use of time-frequency repetition for the grant-free data transmission 14 is permitted, causing transmission of grant-free data transmission 14 using time-frequency repetition; and if it is determined that use of time-frequency repetition for the grant-free data transmission 14 is not permitted, causing transmission of grant-free data transmission 14 without using time-frequency repetition.

In the example of FIG. 1, $UE_2$ determines that time-frequency repetition for the grant-free data transmission 14 is permitted and therefore causes transmission of grant-free data transmission 14 using time-frequency repetition at block 114.

In some, but not necessarily all, examples the method comprises including a first signature with grant-free data transmissions 14 using time-frequency repetition and including a second, different signature with grant-free data transmissions 14 not using time-frequency repetition.

Consequently, in the example of FIG. 1 the $UE_2$ includes a first signature with the grant-free data transmission 14 at block 114.

In examples, the different signature sets are received from the network element 42.

Consequently, FIG. 1 illustrates a method comprising:
receiving a plurality of grant-free data transmissions 14 in at least one time-frequency block 24 of a time-frequency resource pool 22 comprising a plurality of time-frequency blocks 24, the plurality of grant-free data transmissions 14 from a plurality of apparatuses;
determining an interference level of the plurality of grant-free data transmissions 14 in relation to the time-frequency blocks 24 of the resource pool 22;
determining control information 10 in dependence on the determined interference level;
causing transmission of the control information 10 to at least one of the plurality of apparatuses to control usage of time-frequency repetition in grant-free data transmissions 14 from the apparatuses.

The above described method can be performed by any suitable apparatus, for example, an apparatus configured as a server network element.

For example, such method may be performed by an apparatus such as the network element 42 in FIG. 1.

Consequently, method 100 of FIG. 1 also illustrates a method comprising:
receiving at least one signal comprising control information 10;
determining data to transmit using grant-free data transmission 14;
determining whether grant-free data transmission 14 using time-frequency repetition is permitted for the grant-free data transmission 14 in dependence on the received control information 10;
if it is determined that use of time-frequency repetition for the grant-free data transmission 14 is permitted, causing transmission of grant-free data transmission 14 using time-frequency repetition; and
if it is determined that use of time frequency repetition for the grant-free data transmission 14 is not permitted, causing transmission of grant-free data transmission 14 without using time-frequency repetition.

The above method can be performed by any suitable apparatus, for example an apparatus configured as mobile equipment and/or configured as user equipment.

For example, such a method can be performed by an apparatus such as $UE_2$ in FIG. 1.

Additionally, or alternatively such a method can be performed by an apparatus such as $UE_1$ in FIG. 1.

The above described methods may be enabled by a computer program comprising instructions for causing an apparatus to perform a method as described herein, for example, a method comprising at least the following:
receiving at least one signal comprising control information;
determining data to transmit using grant-free data transmission;
determining whether grant-free data transmission using time-frequency repetition is permitted for the grant-free data transmission in dependence on the received control information;
if it is determined that use of time-frequency repetition for the grant-free data transmission is permitted, causing transmission of grant-free data transmission using time-frequency repetition; and
if it is determined that use of time-frequency repetition for the grant-free data transmission is not permitted, causing transmission of grant-free data transmission without using time-frequency repetition.

The computer program can be comprised on a non-transitory computer readable medium.

The above described methods may be enabled by a computer program comprising instructions for causing an apparatus to perform a method as described herein, for example, a method comprising at least the following:
receiving a plurality of grant-free data transmissions in at least one time-frequency block of a time-frequency resource pool comprising a plurality of time-frequency blocks, the plurality of grant-free data transmissions from a plurality of apparatuses;
determining an interference level of the plurality of grant-free data transmissions in relation to the time-frequency blocks of the resource pool;
determining control information in dependence on the determined interference level;
causing transmission of the control information to at least one of the plurality of apparatuses to control usage of time-frequency repetition in grant-free data transmissions from the apparatuses.

The computer program can be comprised on a non-transitory computer readable medium.

Figure 2:
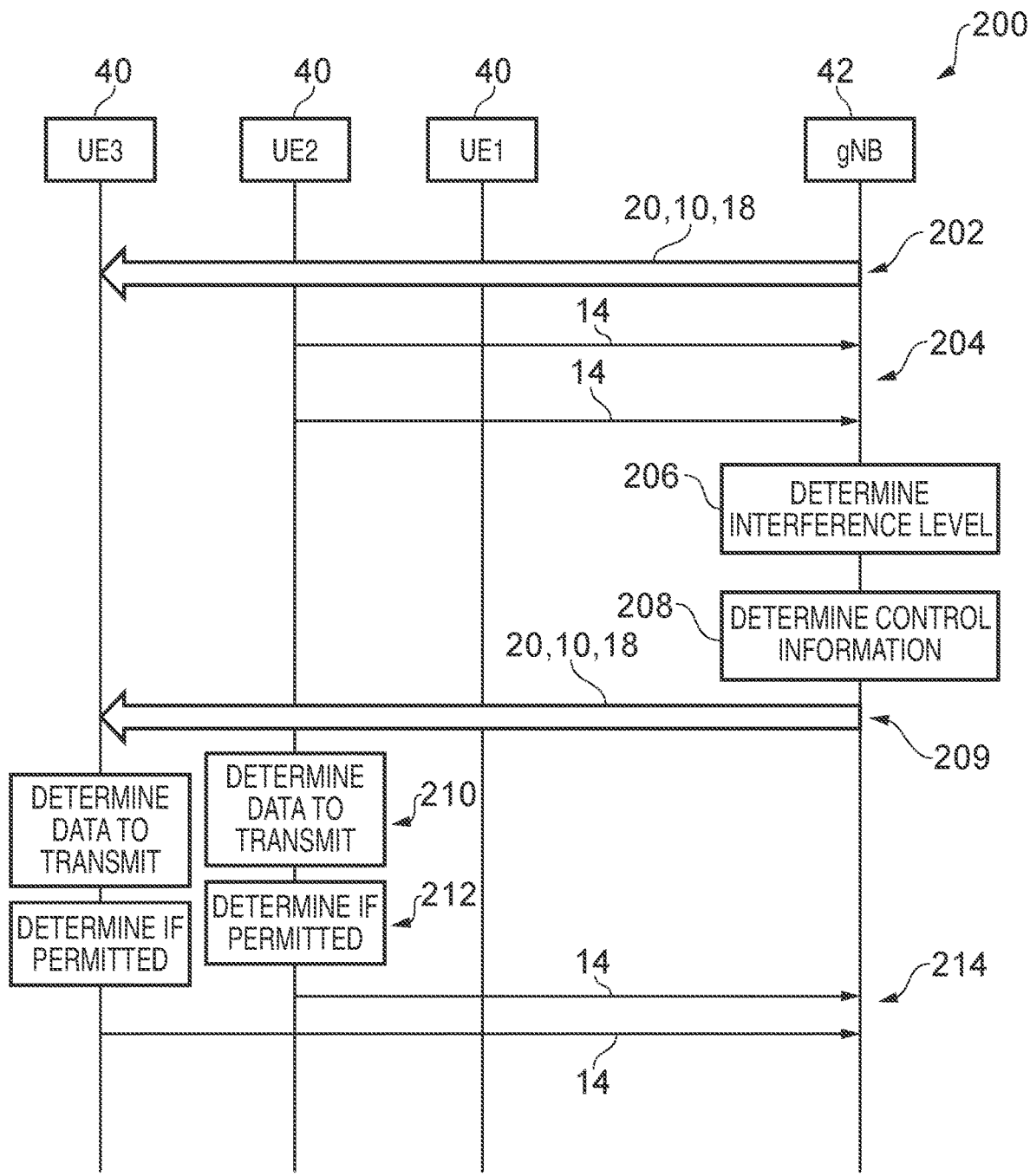
FIG. 2 shows an example embodiment of the subject matter described herein.

FIG. 2 illustrates a method 200.

In the example of FIG. 2, the method 200 is performed by different elements in a network that can be as described in relation to the example of FIG. 1. In the illustrated example, a plurality of UEs 40, $UE_1$, $UE_2$, $UE_3$, communicate with a next generation Node B (gNB) 42.

In examples, the communications between the elements illustrated in FIG. 2 can proceed via any number of intervening elements, including no intervening elements.

Although three UEs 40 are illustrated in the example of FIG. 2, in examples any suitable number of UEs 40 may be included. Similarly, in examples any suitable number of network elements 42 may be included.

That is, in the example of FIG. 2, compared to me example of FIG. 1, the network element is a gNB, however in examples any suitable network element 42 can be used.

At block 202, the method 200 comprises causing transmission of configuration information 20 of a time-frequency resource pool 22 comprising a plurality of time-frequency blocks 24. See, for example, FIG. 3.

For example, the configuration information can comprise information of the number and configuration of time-frequency blocks 24 in the time-frequency resource pool 22.

In examples, the gNB broadcasts a system information block (SIB) to the UEs 40, $UE_1$, $UE_2$, $UE_3$.

Consequently, the method 200 comprises receiving at least one signal comprising configuration information of a time-frequency resource pool 22 comprising a plurality of time-frequency blocks 24 in which grant-free data transmissions 14 can be transmitted.

In the example of FIG. 2, at block 202, the gNB also includes control information 10, in the form of one or more control parameters 18 to control initial use of time-frequency repetition in grant-free data transmissions 14 from the UEs.

In examples any suitable control information 10 can be included.

In the illustrated example, the control parameter 18 is configured to control the probability that a UE can use time-frequency repetition in a grant-free data transmission 14.

In the illustrate example, the gNB, at block 202, broadcasts a control parameter 18 with a value of 1 which means that the UEs can initially use time-frequency repetition for grant-free data transmissions 14 without restriction.

Additionally or alternatively the network element 42, such as the gNB, broadcasts, in some examples, signature sets for the UEs 40 to use with grant-free data transmissions 14.

In examples, the network element 42 configures separate signature sets for use with and without time-frequency repetition.

Block 204 of method 200 is the same/similar to block 102 of method 100 of FIG. 1. Accordingly, block 204 can be as described in relation to block 102 of FIG. 1.

In the example of FIG. 2, $UE_1$ and $UE_2$ determine that they have data to transmit (not illustrated) prior to causing transmission of the data at block 204, this can be as described in relation to block 110 of FIG. 1.

UE1 and UE2 therefore cause transmission of grant-free data transmissions 14 using time-frequency repetition as the control parameter 18 is set to 1 allowing use of time-frequency repetition for the grant-free data transmissions 14 without restriction.

Block 206 of method 200 is the same/similar to block 104 of method 100 in FIG. 1 and therefore may be as described in relation to block 104 of FIG. 1.

Block 208 of method 200 can be the same/similar as block 106 of method 100 of FIG. 1 and therefore can be as described in relation to block 106 of FIG. 1.

In the example of FIG. 2, at block 208 the gNB determines that the interference level is too high and therefore determines updated control information 10. In the illustrated example, the gNB determines an updated control parameter 18 as the updated control information 10.

At block 209 the gNB broadcasts the updated control information to the UEs.

That is, at block 209 the method comprises causing transmission of updated control information 10 to at least one of the plurality of apparatuses to control usage of time-frequency repetition in grant-free data transmissions 14 from the apparatuses.

Consequently, the method 200 therefore also comprises receiving the updated control information 10 at one or more of the UEs.

In the example of FIG. 2 the updated control information 10 in the form of at least one updated control parameter 18 is broadcast to $UE_1$, $UE_2$ and $UE_3$.

Furthermore, in the example of FIG. 2 at block 20, the gNB causes transmission of updated configuration information of an updated time-frequency resource pool 22 comprising a plurality of time-frequency blocks 24 in which grant-free data transmissions 14 can be transmitted.

Consequently, in examples the method also comprises receiving updated configuration information 20 of an updated time-frequency resource pool 22 comprising a plurality of time-frequency blocks 24 in which grant-free data transmissions 14 can be transmitted.

In FIG. 2, the gNB utilizes a system information block to provide the updated information 20, 10, 18.

In some examples, updated configuration information 20 can be provided without updated control information 10. Similarly, in examples, updated control information 10 such as one or more updated control parameters 18, can be provided without updated configuration information 20.

In FIG. 2, the updated control information, is an updated control parameter 18 in which the gNB has reduced the parameter value from 1 to 0.8. This therefore has the effect of controlling use of time-frequency repetition in grant-free data transmissions 14 to 80% of the time.

Accordingly, in the example of FIG. 2 the gNB has determined from the determined interference level that a reduction in use of time-frequency repetition by the UEs in grant-free data transmissions 14 is to be implemented.

In examples, the updated configuration information 20 and/or control information 10, 18 includes an associated time to take effect and/or time period in which the information is effective.

In examples, the time to take effect is the next resource pool 22 or a number of resource pools 22.

In some examples the time to take effect is predetermined. For example, the default value of the time to take effect can be the next resource pool 22. Consequently, in examples the apparatuses, such as the UEs, can use the predetermined value without receiving time to take effect information from the network element 42.

In examples any configuration information 20 and/or control information 10 can include an associated time to take effect and/or time period in which the information is effective.

The UEs keep a valid value of the control information 10 and/or control parameter 18 and the related time to take effect.

At block 210 $UE_2$ and $UE_3$ determine that they have data to transmit using grant-free data transmission 14. Block 210 may be similar/the same as the block 110 of FIG. 1 and therefore may be as described in relation to block 110 of FIG. 1.

In the example of FIG. 2 $UE_1$ does not have data to transmit.

At block 212 of method 200 $UE_2$ and $UE_3$ determine whether grant-free data transmission 14 using time-frequency repetition is permitted for the grant-free data transmission 14 in dependence on the received updated control information 10, 18.

In the example of FIG. 2, $UE_2$ and $UE_3$ generate a random number and make a comparison against the updated control parameter 18. In the example, if the generated random number is smaller than the valid control parameter 18, which in the example is set at 0.8, the UE is permitted to use time-frequency repetition for grant-free data transmission 14.

In the example of FIG. 2, at block 214, $UE_2$ and $UE_3$ cause transmission of grant-free data transmission 14.

However, in the example of FIG. 2, $UE_3$ determines that time frequency repetition is permitted and therefore causes transmission of grant-free data transmission 14 using time-frequency repetition.

However, in the illustrated example, $UE_2$ determines that time-frequency repetition is not permitted and therefore causes transmission of the grant-free data transmission 14 without using time-frequency repetition.

It can therefore be seen from, for example, FIG. 1 and FIG. 2 that the serving network element, such as a gNB, can control usage of time-frequency repetition by apparatuses such as UEs.

This is advantageous as it allows the network element to control the use of time-frequency repetition for grant-free data transmissions 14 to control the interference level in relation to the resource pool.

Additionally, this enables the system to improve decoding success rate with time variable traffic load.

In some examples the control information 10 is configured to control the number of time-frequency repetitions used in grant-free data transmission 14 using time-frequency repetition.

That is, in some examples, the control information does not provide modal control of whether time-frequency repetition can be used for a grant-free data transmission 14 but rather provides control over how many repetitions can be used for a grant-free data transmission.

In such examples the method may therefore comprise:
receiving at least one signal comprising control information;
  determining data to transmit using grant-free data transmission using time-frequency repetition;
  determining a number of time-frequency repetitions to use in the grant-free data transmission in dependence on the control information;
causing transmission of grant-free data transmission using the determined number of time-frequency repetitions.
  Similarly, the method may comprise:
receiving a plurality of grant-free data transmissions in at least one time-frequency block of a time-frequency resource pool comprising a plurality of time-frequency blocks, the plurality of grant-free data transmissions from a plurality of apparatuses;
  determining an interference level of the plurality of grant-free data transmissions in relation to the time-frequency blocks of the resource pool;
  determining control information in dependence on the determined interference level;
  causing transmission of the control information to at least one of the plurality of apparatuses to control the number of repetitions used in time-frequency repetition in grant-free data transmissions from the apparatuses.

$3^{rd}$ Generation Partnership Project (3GPP) Examples

Some examples relate to a third generation Partnership Project (3GPP) network.

Some such examples are now described in relation to the example of FIG. 2.

Abbreviations:
3GPP 3rd generation partnership project
ACK Acknowledgement
GFT Grant-free transmission
gNB next Generation NodeB
LTE Long Term Evolution
LTE-A LTE-Advanced
HARQ Hybrid Automatic Repeat reQuest
MA Multiple Access
MTC Machine Type Communications
mMTC Massive MTC
NACK Negative Acknowledgement
NR New Radio
RACH Random Access Channel
RU Resource Unit
SIC Successive Interference Cancellation
SIB System Information Block
UE User Equipment
UL UpLink In examples, the gNB broadcasts a diversity factor for GFT to control the probabilities of UEs to initiate GFT with time-frequency repetition/diversity.

At block 202 the gNB implicitly indicates its capability to support diversity by the SIB with resource configuration of RP and RU for GFT.

In examples, at the initial phase, the gNB broadcasts the control parameter 18/diversity factor=1. This means that all UEs can initially transmit their UL grant-free transmission with diversity.

In examples, the gNB configures separate MA signature sets for GFT with diversity and without diversity. The MA signature resource separation can also be broadcasted in the SIB.

With the received SIB, all UEs in the system know diversity is allowed for GFT.

However only the UE1 and UE2 have UL data to transmit. Therefore, they both initiate the grant-free transmission with diversity with selected MA signature from the configured MA signature set for diversity.

The gNB tries to decode the UL data if it detects MA signature in any of the resource unit. With the detected MA signature, the gNB knows whether the diversity is applied or not by the UEs.

In this example, the decoding result for UE1 is successful while the decoding result for UE2 is failed.

At block 206 the gNB estimates the collision rate by the MA signature detection results and/or the SIC decoding results.

If the gNB determines to control the collision rate, at block 208, it updates the diversity factor to instruct the UEs to update the probability to initiate the GFT. A higher the diversity factor indicates a lower collision rate, and a higher probability to allow the UE to use diversity.

In examples, the time period considered includes one or more RPs, which reflects the density and the gNB can adjust the diversity factor.

In examples, the gNB can keep a mapping table, in which a certain SIC decoding success rate is related to a certain diversity factor.

At block 209, the gNB broadcasts the updated diversity factor via SIB.

In some examples, the RP for the updated diversity factor to take effect is also conveyed together with the diversity factor. In some examples, the time to take effect is preconfigured.

In examples, the time to take effect is the next resource pool. The UEs keep a valid value of the diversity factor and the related time to take effect.

If the updated diversity factor is less than 1. A UE having UL data to transmit calculates whether the diversity for GFT is allowed or not.

In examples, the UE draws a random number p uniformly distributed in the range: $0 \leq p < 1$. If the p is smaller than the valid diversity factor, the UE considers the diversity for GFT is allowed.

At block 210 UE2 and UE3 determine that they have data to transmit and at block 212 determine if use of diversity is permitted.

In the illustrated example UE3 determined that diversity for GFT is allowed however UE2 determined it is not allowed.

Consequently, UE2 transmits UL data without diversity and UE3 transmits UL data with diversity.

FIG. 3 illustrates an example of a time-frequency resource pool 22 comprising a plurality of time-frequency blocks 24.

In the example of FIG. 3, the resource pool 22 comprises N by M time-frequency blocks, which can, in some examples, be referred to as resource units.

As described in relation to FIGS. 1 and 2, apparatuses, such as UEs, can transmit grant-free data transmissions 14 in one or more of the resource units.

Figure 4:
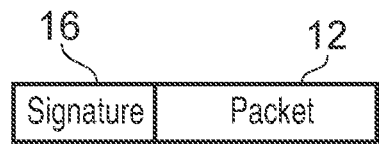
FIG. 4 shows an example embodiment of the subject matter described herein.

An example of a data structure that an apparatus can transmit in a grant-free data transmission 14 is illustrated in the example of FIG. 4.

In the example FIG. 3, four UEs transmit grant-free transmissions 14 in a plurality of resource units 24 of the resource pool 22.

As the data transmissions are grant-free collisions between UE transmissions can readily occur. See, for example, resource unit N+2, M+3 in which $UE_1$, $UE_3$ and $UE_4$ have provided a grant-free data transmission.

Any suitable method for determining the identification of the transmitting UE can be used. For example, the data structure can include one or more signatures identifying the UE transmitting. See, for example, FIG. 4.

The inventors have realized that with increased transmission arrival rate, including the use of time-frequency repetition, the number of collisions and/or the capabilities of the decoder can mean that the use of time-frequency repetition causes a reduction in throughput/an increase in failure rate.

For example, in the example of FIG. 3, depending on the capability of the decoder, one or more of the data transmissions from one or more of the UEs may fail to be decoded successfully.

The inventors have realized the use of control information 10 as described in relation to, for example, FIGS. 1 and 2, to control the interference rate and/or collision rate for grant-free transmissions using time-frequency repetition is beneficial.

The inventors have also realized that the use of control information 10 in this way improves decoding success rate with time variable traffic load.

In the frequency domain the RP can include one or more physical transmission block. In the time domain the RP can include one or more radio frames.

FIG. 4 illustrates an example of a data structure.

For example, the data structure illustrated in FIG. 4 can form at least part of a grant-free data transmission 14 from a UE.

The data structure in FIG. 4 comprises data 12 in the form of a packet and a signature 16 to identify the transmitting UE.

In examples, the signature 16 can also be used to identify whether or not the transmitting UE is using time-frequency repetition. For example, a UE may use a first signature when using time-frequency repetition and a second signature when not using time-frequency repetition.

In examples, a UE can transmit such a data structure in a time-frequency block/resource unit of a resource pool 22.

The use of signatures 16 allows the network element to identify a number of different transmitting UEs and/or the UEs that are using time-frequency repetition.

Figure 5:
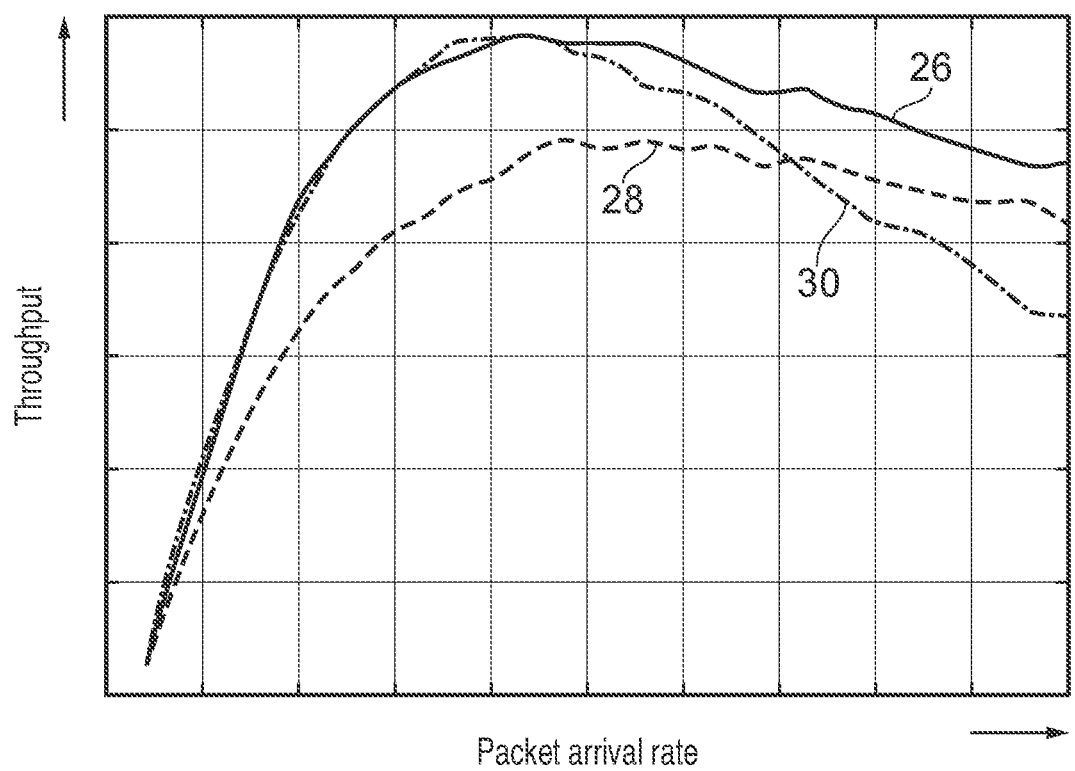
FIG. 5 shows an example embodiment of the subject matter described herein.

FIG. 5 illustrates a plot of packet arrival rate against throughput.

In FIG. 5, the technical benefits of examples of the disclosure can be seen.

In the example of FIG. 5, the dashed line 28 illustrates simulated results of throughput for increasing packet arrival rate without using time-frequency repetition.

The dot dashed line 30 in the example of FIG. 5 illustrates the simulated results using time-frequency repetition.

It can be seen that the use of time-frequency repetition provides greater throughput at lower packet arrival rate but causes a decrease in throughput at higher packet arrival rates compared to transmissions without time-frequency repetition.

However, in the example of FIG. 5, the solid line 26 illustrates simulated results with use of control of time-frequency repetition as described herein.

In the illustrated example, the results for modal control of time-frequency repetition are illustrated. That is control of whether or not time-frequency is permitted for a grant-free data transmission 14.

It can be seen from FIG. 5 that, with use of control of time-frequency repetition, improved throughput for high packet arrival rate can be achieved compared to non-use of time-frequency repetition and use of time-frequency repetition without control.

Accordingly, it can be seen from FIG. 5 that examples of the disclosure provide for, for example, improved throughput in a network and therefore improved transmission efficiency.

FIG. 6 illustrates an example of a controller 60 of an apparatus, such as UE 40 or network element 42. Implementation of a controller 60 may be as controller circuitry. The controller 60 may be implemented in hardware alone, have certain aspects in software including firmware alone or can be a combination of hardware and software (including firmware).

As illustrated in FIG. 6A the controller 50 may be implemented using instructions that enable hardware functionality, for example, by using executable instructions of a computer program 66 in a general-purpose or special-purpose processor 62 that may be stored on a computer readable storage medium (disk, memory etc) to be executed by such a processor 62.

The processor 62 is configured to read from and write to the memory 64. The processor 62 may also comprise an output interface via which data and/or commands are output by the processor 62 and an input interface via which data and/or commands are input to the processor 62.

The memory 64 stores a computer program 66 comprising computer program instructions (computer program code)

that controls the operation of the apparatus when loaded into the processor 62. The computer program instructions, of the computer program 66, provide the logic and routines that enables the apparatus to perform the methods as described herein and, for example, as illustrated in FIGS. 1 and 2. The processor 62 by reading the memory 64 is able to load and execute the computer program 66.

The apparatus therefore comprises:

at least one processor 62; and at least one memory 64 including computer program code the at least one memory 64 and the computer program code configured to, with the at least one processor 62, cause the apparatus at least to perform:

receiving at least one signal comprising control information;
    determining data to transmit using grant-free data transmission;
    determining whether grant-free data transmission using time-frequency repetition is permitted for the grant-free data transmission in dependence on the received control information;
    if it is determined that use of time-frequency repetition for the grant-free data transmission is permitted, causing transmission of grant-free data transmission using time-frequency repetition; and
    if it is determined that use of time-frequency repetition for the grant-free data transmission is not permitted, causing transmission of grant-free data transmission without using time-frequency repetition.

The apparatus therefore comprises:

at least one processor 62; and at least one memory 64 including computer program code the at least one memory 64 and the computer program code configured to, with the at least one processor 62, cause the apparatus at least to perform:

receiving a plurality of grant-free data transmissions in at least one time-frequency block of a time-frequency resource pool comprising a plurality of time-frequency blocks, the plurality of grant-free data transmissions from a plurality of apparatuses;
    determining an interference level of the plurality of grant-free data transmissions in relation to the time-frequency blocks of the resource pool;
    determining control information in dependence on the determined interference level;
    causing transmission of the control information to at least one of the plurality of apparatuses to control usage of time-frequency repetition in grant-free data transmissions from the apparatuses.

As illustrated in FIG. 7A, the computer program 66 may arrive at the apparatus via any suitable delivery mechanism 68. The delivery mechanism 68 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD), see for example FIG. 7B, or a memory stick, see for example FIG. 7C, a solid state memory, an article of manufacture that comprises or tangibly embodies the computer program 66. The delivery mechanism may be a signal configured to reliably transfer the computer program 66. The apparatus may propagate or transmit the computer program 66 as a computer data signal.

Computer program instructions for causing an apparatus to perform at least the following or for performing at least the following:

determining data to transmit using grant-free data transmission;
    determining whether grant-free data transmission using time-frequency repetition is permitted for the grant-free data transmission in dependence on the received control information;
    if it is determined that use of time-frequency repetition for the grant-free data transmission is permitted, causing transmission of grant-free data transmission using time-frequency repetition; and
    if it is determined that use of time-frequency repetition for the grant-free data transmission is not permitted, causing transmission of grant-free data transmission without using time-frequency repetition.

Computer program instructions for causing an apparatus to perform at least the following or for performing at least the following:

receiving a plurality of grant-free data transmissions in at least one time-frequency block of a time-frequency resource pool comprising a plurality of time-frequency blocks, the plurality of grant-free data transmissions from a plurality of apparatuses;
    determining an interference level of the plurality of grant-free data transmissions in relation to the time-frequency blocks of the resource pool;
    determining control information in dependence on the determined interference level;
    causing transmission of the control information to at least one of the plurality of apparatuses to control usage of time-frequency repetition in grant-free data transmissions from the apparatuses.

The computer program instructions may be comprised in a computer program, a non-transitory computer readable medium, a computer program product, a machine readable medium. In some but not necessarily all examples, the computer program instructions may be distributed over more than one computer program.

Although the memory 64 is illustrated as a single component/circuitry it may be implemented as one or more separate components/circuitry some or all of which may be integrated/removable and/or may provide permanent/semi-permanent/dynamic/cached storage.

In examples the memory 64 comprises a random access memory 70 and a read only memory 72. In examples the computer program 66 can be stored in the read only memory 72. See, for example, FIG. 6B.

In some examples the memory 64 can be split into random access memory 70 and read only memory 72.

Although the processor 62 is illustrated as a single component/circuitry it may be implemented as one or more separate components/circuitry some or all of which may be integrated/removable. The processor 62 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 1 and 2 may represent steps in a method and/or sections of code in the computer program 66. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Thus the apparatus can comprise means for:
determining data to transmit using grant-free data transmission;
determining whether grant-free data transmission using time-frequency repetition is permitted for the grant-free data transmission in dependence on the received control information;
if it is determined that use of time-frequency repetition for the grant-free data transmission is permitted, causing transmission of grant-free data transmission using time-frequency repetition; and
if it is determined that use of time-frequency repetition for the grant-free data transmission is not permitted, causing transmission of grant-free data transmission without using time-frequency repetition.

Thus the apparatus can comprise means for:
receiving a plurality of grant-free data transmissions in at least one time-frequency block of a time-frequency resource pool comprising a plurality of time-frequency blocks, the plurality of grant-free data transmissions from a plurality of apparatuses;
determining an interference level of the plurality of grant-free data transmissions in relation to the time-frequency blocks of the resource pool;
determining control information in dependence on the determined interference level;
causing transmission of the control information to at least one of the plurality of apparatuses to control usage of time-frequency repetition in grant-free data transmissions from the apparatuses.

The apparatus may be part of the Internet of Things forming part of a larger, distributed network.

The apparatus can be configured as mobile equipment and/or configured as user equipment.

In examples the apparatus comprises a number of additional features, such as at least one communication interface, at least one display, at least one user input and so on.

In examples the at least one communication interface comprises at least one antenna.

In examples operation of one or more additional feature is controlled by the controller 60.

The apparatus can be configured as a server network element.

In examples the apparatus comprises a number of additional features, such as at least one communication interface, at least one display, at least one user input and so on.

In examples the at least one communication interface comprises at least one antenna.

In examples operation of one or more additional feature is controlled by the controller 60.

As used here 'module' refers to a unit or apparatus that excludes certain parts/components that would be added by an end manufacturer or a user.

As used herein 'information' and 'data' can be used interchangeably.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

What is claimed is:

1. An apparatus comprising:
at least one processor; and
at least one memory including computer program code,
the at least one memory and the computer program code configured to, with the at least one processor, cause the apparatus at least to perform:
receiving at least one signal comprising control information including at least one control parameter;
determining data to transmit using grant-free data transmission;
determining whether grant-free data transmission using time-frequency repetition is permitted for the grant-free data transmission in dependence on the received control information by generating at least one random number and determining whether grant-free data transmission using time-frequency repetition is permitted for a grant-free data transmission based on the at least one random number and the at least one control parameter;
if it is determined that use of time-frequency repetition for the grant-free data transmission is permitted, causing transmission of grant-free data transmission using time-frequency repetition; and
if it is determined that use of time-frequency repetition for the grant-free data transmission is not permitted, causing transmission of grant-free data transmission without using time-frequency repetition.

2. An apparatus as claimed in claim 1, the at least one memory and the computer program configured to, with the at least one processor, cause the apparatus at least to perform:
including a first signature with grant-free data transmissions using time-frequency repetition and including a second, different signature with grant-free data transmissions not using time-frequency repetition.

3. An apparatus as claimed in claim 1, wherein the control information is configured to control whether time-frequency repetition is permitted for a grant-free data transmission in terms of a probability.

4. An apparatus as claimed in claim 1, the at least one memory and the computer program code configured to, with the at least one processor, cause the apparatus at least to perform:
determining a time period for which the control information is valid.

5. An apparatus as claimed in claim 1, the at least one memory and the computer program code configured to, with the at least one processor, cause the apparatus at least to perform:
receiving at least one signal comprising configuration information of a time-frequency resource pool comprising a plurality of time-frequency blocks in which grant-free data transmissions can be transmitted.

6. An apparatus as claimed in claim 5, the at least one memory and the computer program code configured to, with the at least one processor, cause the apparatus at least to perform:
receiving updated configuration information of an updated time-frequency resource pool comprising a plurality of time-frequency blocks in which grant-free data transmissions can be transmitted.

7. A method comprising:
receiving at least one signal comprising control information including at least one control parameter;
determining data to transmit using grant-free data transmission;
determining whether grant-free data transmission using time-frequency repetition is permitted for the grant-free data transmission in dependence on the received control information by generating at least one random number and determining whether grant-free data transmission using time-frequency repetition is permitted for a grant-free data transmission based on the at least one random number and the at least one control parameter;
if it is determined that use of time-frequency repetition for the grant-free data transmission is permitted, causing transmission of grant-free data transmission using time-frequency repetition; and
if it is determined that use of time-frequency repetition for the grant-free data transmission is not permitted, causing transmission of grant-free data transmission without using time-frequency repetition.

8. A method as claimed in claim 7, comprising:
including a first signature with grant-free data transmissions using time-frequency repetition and including a second, different signature with grant-free data transmissions not using time-frequency repetition.

* * * * *